(12) United States Patent
Zhu

(10) Patent No.: US 8,093,345 B2
(45) Date of Patent: Jan. 10, 2012

(54) METHOD OF PREPARING A SILICONE RESIN

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 267 days.

(21) Appl. No.: 12/374,378

(22) PCT Filed: Jun. 13, 2007

(86) PCT No.: PCT/US2007/013836
§ 371 (c)(1), (2), (4) Date: Jan. 20, 2009

(87) PCT Pub. No.: WO2009/113971
PCT Pub. Date: Sep. 17, 2009

(65) Prior Publication Data
US 2010/0273972 A1    Oct. 28, 2010

Related U.S. Application Data

(60) Provisional application No. 60/833,648, filed on Jul. 27, 2006.

(51) Int. Cl.
*C08G 77/04*    (2006.01)
(52) U.S. Cl. ......................................................... 528/29
(58) Field of Classification Search ........................ None
See application file for complete search history.

(56) References Cited

U.S. PATENT DOCUMENTS

| | | | |
|---|---|---|---|
| 736,971 A | 8/1903 | Jenkins | |
| 2,390,378 A * | 12/1945 | Marsden | 528/12 |
| 2,553,845 A * | 5/1951 | Clark | 556/471 |
| 2,584,343 A * | 2/1952 | Goodwin, Jr. et al. | 528/26 |
| 2,672,104 A * | 3/1954 | Clark | 249/115 |
| 3,018,270 A * | 1/1962 | Toogood | 528/43 |
| 3,450,672 A * | 6/1969 | Merrill | 528/12 |
| 3,650,852 A * | 3/1972 | Davis et al. | 528/12 |
| 3,684,756 A * | 8/1972 | Brooks | 524/731 |
| 4,460,638 A | 7/1984 | Haluska | |
| 4,618,666 A | 10/1986 | Porte | |
| 4,761,454 A | 8/1988 | Oba et al. | |
| 5,312,946 A * | 5/1994 | Stank et al. | 516/72 |
| 5,371,139 A | 12/1994 | Yokoyama et al. | |
| 5,391,227 A * | 2/1995 | Stank et al. | 106/287.13 |
| 5,801,262 A | 9/1998 | Adams | |
| 5,939,500 A * | 8/1999 | Itoh et al. | 525/478 |
| 6,232,424 B1 * | 5/2001 | Zhong et al. | 528/12 |
| 6,376,078 B1 | 4/2002 | Inokuchi | |
| 6,399,733 B1 * | 6/2002 | Yamamoto et al. | 528/12 |
| 2004/0138399 A1 * | 7/2004 | MacKinnon et al. | 528/31 |
| 2006/0167297 A1 * | 7/2006 | Schattenmann et al. | 556/482 |

FOREIGN PATENT DOCUMENTS

| | | |
|---|---|---|
| DE | 4033157 | 9/1993 |
| DE | 4033157 A1 | 9/1993 |
| EP | 0566311 A2 | 10/1993 |
| JP | 59-096122 | 5/1984 |
| WO | WO 03/099828 | 12/2003 |

OTHER PUBLICATIONS

Reese, Herschel, "Development of Silicone Substrates to be used with CIGS Deposition," 2005, AFRL/NL report.
English Translation of DE 4033157A1; publication date Sep. 9, 1993.

* cited by examiner

*Primary Examiner* — Robert Loewe
(74) *Attorney, Agent, or Firm* — Howard & Howard Attorneys PLLC

(57) ABSTRACT

A method of preparing a silicone resin, the method comprising reacting at least one halodisilane and, optionally, at least one halosilane with at least one alcohol in the presence of an organic solvent to produce an alcoholysis product; reacting the alcoholysis product with water to produce a hydrolyzate; and heating the hydrolyzate to produce the resin.

14 Claims, No Drawings

METHOD OF PREPARING A SILICONE RESIN

CROSS-REFERENCE TO RELATED APPLICATIONS

This application is a U.S. national stage filing under 35 U.S.C. §371 of PCT Application No. PCT/US07/013,836 filed on 13 Jun. 2007, currently pending, which claims the benefit of U.S. Provisional Patent Application No. 60/833,648 filed 27 Jul. 2006 under 35 U.S.C. §119 (e). PCT Application No. PCT/US07/013,836 and U.S. Provisional Patent Application No. 60/833,648 are hereby incorporated by reference.

FIELD OF THE INVENTION

The present invention relates to a method of preparing a silicone resin and more particularly to a method comprising reacting at least one halodisilane and, optionally, at least one halosilane with at least one alcohol in the presence of an organic solvent to produce an alcoholysis product; reacting the alcoholysis product with water to produce a hydrolyzate; and heating the hydrolyzate to produce the resin.

BACKGROUND OF THE INVENTION

Methods of preparing silicone materials from disilanes are known in the art. For example, U.S. Pat. No. 736,971 to Chassot discloses a process for the production of an organosilicon resin containing both —Si—Si— and —Si—O—Si— linkages in its molecule, which comprises subjecting to hydrolysis and simultaneous condensation an organopolysilane of the general formula $(CH_3)_m Si_n X_p$, where X represents a hydrolysable radical, n is a whole number greater than 1, and m, p, and n are related by the equation $m+p=2n+2$.

U.S. Pat. No. 4,618,666 to Porte discloses an organosilicon resin containing recurring disilane units, which comprises the reaction product of a simultaneous cohydrolysis and condensation reaction in a heterogeneous solvent medium of an admixture of organochlorsilanes and organochlorodisilanes.

Derwent World Patent Index Abstract of German Patent Publication No. DE 4,033,157 A to Albrecht et al. discloses production of soluble methylalkyloxypoly (disilyl)siloxanes, which comprises the single step alkoxylation and hydrolysis of disilane-containing distillation residue (A) from methylchlorosilane synthesis, or of the isolated disilanes, (A'). (A) or (A'), is reacted at reflux with a hydrolysis medium consisting of concentrated HCl (which provides an amount of water equimolar to the Si—Cl content in the starting material) and lower alkanol in presence of an inert organic solvent not miscible with the medium. The weight ratio of (A) or (A'), to alcohol is 1:0.5 to 1:4, and that of (A) or (A') to solvent is 1:9 to 1:0.2.

Although the aforementioned references disclose methods of preparing silicone materials from disilanes, there remains a need for a method of producing a silicone resin that is curable, substantially free of gel, and highly soluble in organic solvents.

SUMMARY OF THE INVENTION

The present invention is directed to a method of preparing a silicone resin, the method comprising:
(i) reacting at least one halodisilane having the formula $Z_{3-a}R^1_a Si—SiR^1_b Z_{3-b}$ and, optionally, at least one halosilane having the formula $R^1_b SiZ_{4-b}$ with at least one alcohol having the formula $R^2 OH$ in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, and b=0, 1, 2 or 3;
(ii) reacting the alcoholysis product with water at a temperature of from 0 to 40° C. to produce a hydrolyzate; and
(iii) heating the hydrolyzate to produce the resin.

The method of the present invention produces a silicone resin that is curable, substantially free of gel, and highly soluble in organic solvents. Moreover, the method can be utilized to produce a silicone resin having high molecular weight. Also, the silicone resin can be readily and efficiently removed from the reaction mixture. Further, the method can be carried out economically with readily available starting materials. Still further, the method can be scaled to a commercial manufacturing process.

The silicone resin product of the present method can be used to form a cured coating on substrates employed in numerous electronic devices, including semiconductor devices, liquid crystals, light-emitting diodes, organic light-emitting diodes, optoelectronic devices, optical devices, photovoltaic cells, thin film batteries, and solar cells.

DETAILED DESCRIPTION OF THE INVENTION

A method of preparing a silicone resin according to the present invention comprises:
(i) reacting at least one halodisilane having the formula $Z_{3-a}R^1_a Si—SiR^1_b Z_{3-b}$ and, optionally, at least one halosilane having the formula $R^1_b SiZ_{4-b}$ with at least one alcohol having the formula $R^2 OH$ in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, and b=0, 1, 2 or 3;
(ii) reacting the alcoholysis product with water at a temperature of from 0 to 40° C. to produce a hydrolyzate; and
(iii) heating the hydrolyzate to produce the resin.

In step (i) of the method of preparing the silicone resin at least one halodisilane having the formula $Z_{3-a}R^1_a Si—SiR^1_b Z_{3-b}$ and, optionally, at least one halosilane having the formula $R^1_b SiZ_{4-b}$ are reacted with at least one alcohol having the formula $R^2 OH$ in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, and b=0, 1, 2 or 3. As used herein, the term "alcoholysis product" refers to a product formed by replacement of the silicon-bonded halogen atom(s) in the halodisilane and, when present, the halosilane with the group —$OR^2$, wherein $R^2$ is as described and exemplified below.

The halodisilane is at least one halodisilane having the formula $Z_{3-a}R^1_a Si—SiR^1_b Z_{3-b}$, wherein each $R^1$ is independently —H, hydrocarbyl, or substituted hydrocarbyl, Z is halo, a=0, 1, or 2, and b=0, 1, 2 or 3. Examples of halo atoms represented by Z include —F, —Cl, —Br, and —I.

The hydrocarbyl groups represented by $R^1$ typically have from 1 to 10 carbon atoms, alternatively from 1 to 6 carbon atoms, alternatively from 1 to 4 carbon atoms. Acyclic hydrocarbyl groups containing at least three carbon atoms can have a branched or unbranched structure. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and napthyl; alkaryl, such as tolyl and xylyl; arakyl, such as benzyl and phenethyl; alkenyl, such as vinyl, allyl, and propenyl; aralkenyl, such as styryl and cinnamyl; and alkynyl, such as ethynyl and propynyl.

The substituted hydrocarbyl groups represented by $R^1$ can contain one or more of the same or different substituents, provided the substituent does not prevent formation of the alcoholysis product, the hydrolyzate, or the silicone resin. Examples of substituents include, but are not limited to, —F, —Cl, —Br, —I, —OH, —OR$^3$, —OCH$_2$CH$_2$OR$^4$, —CO$_2$R$^4$, —OC(=O)R$^3$, —C(=O)NR$^4{}_2$, wherein $R^3$ is $C_1$ to $C_8$ hydrocarbyl and $R^4$ is $R^3$ or —H.

The hydrocarbyl groups represented by $R^3$ typically have from 1 to 8 carbon atoms, alternatively from 3 to 6 carbon atoms. Acyclic hydrocarbyl groups containing at least 3 carbon atoms can have a branched or unbranched structure. Examples of hydrocarbyl include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; aryalkenyl, such as styryl; and alkynyl, such as ethynyl and propynyl.

Examples of halodisilanes include, but are not limited to, disilanes having the formulae: $Cl_2MeSiSiMeCl_2$, $Cl_2MeSiSiMe_2Cl$, $Cl_3SiSiMeCl_2$, $Cl_2EtSiSiEtCl_2$, $Cl_2EtSiSiEt_2Cl$, $Cl_3SiSiEtCl_2$, $Cl_3SiSiCl_3$, $Br_2MeSiSiMeBr_2$, $Br_2MeSiSiMe_2Br$, $Br_3SiSiMeBr_2$, $Br_2EtSiSiEtBr_2$, $Br_2EtSiSiEt_2Br$, $Br_3SiSiEtBr_2$, $Br_3SiSiBr_3$, $I_2MeSiSiMeI_2$, $I_2MeSiSiMe_2I$, $I_3SiSiMeI_2$, $I_2EtSiSiEtI_2$, $I_2EtSiSiEt_2I$, $I_3SiSiEtI_2$, and $I_3SiSiI_3$, where Me is methyl and Et is ethyl.

The halodisilane can be a single halodisilane or a mixture comprising two or more different halodisilanes, each having the formula $Z_{3-a}R^1{}_aSi—SiR^1{}_bZ_{3-b}$, wherein $R^1$, Z, a, and b are as described and exemplified above.

Methods of preparing halodisilanes are well known in the art; many of these compounds are commercially available. Also, the halodisilane can be obtained from the residue having a boiling point greater than 70° C. produced in the Direct Process for making methylchlorosilanes, as taught in WO 03/099828. Fractional distillation of the Direct Process residue gives a methylchlorodisilane stream containing a mixture of chlorodisilanes.

The optional halosilane is at least one halosilane having the formula $R^1{}_bSiZ_{4-b}$, wherein each $R^1$ is independently —H, hydrocarbyl, or substituted hydrocarbyl, Z is halo, and b=0, 1, 2 or 3.

Examples of halosilanes include, but are not limited to, silanes having the formulae: $SiCl_4$, $SiBr_4$, $HSiCl_3$, $HSiBr_3$, $MeSiCl_3$, $EtSiCl_3$, $MeSiBr_3$, $EtSiBr_3$, $Me_2SiCl_2$, $Et_2SiCl_2$, $Me_2SiBr_2$, $Et_2SiBr_2$, $Me_3SiCl$, $Et_3SiCl$, and $Me_3SiBr$, $Et_3SiBr$, where Me is methyl and Et is ethyl.

The halosilane can be a single halosilane or a mixture comprising two or more different halosilanes, each having the formula $R^1{}_bSiZ_{4-b}$, wherein $R^1$, Z, and b are as described and exemplified above. Further, methods of preparing halosilanes are well known in the art; many of these compounds are commercially available.

The alcohol is at least one alcohol having the formula $R^2OH$, wherein $R^2$ is alkyl or cycloalkyl. The structure of the alcohol can be linear or branched. Also, the hydroxy group in the alcohol may be attached to a primary, secondary or tertiary carbon atom.

The alkyl groups represented by $R^2$ typically have from 1 to 8 carbon atoms, alternatively from 1 to 6 carbon atoms, alternatively from 1 to 4 carbon atoms. Alkyl groups containing at least 3 carbon atoms can have a branched or unbranched structure. Examples of alkyl groups include, but are not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl.

The cycloalkyl groups represented by $R^2$ typically have from 3 to 12 carbon atoms, alternatively from 4 to 10 carbon atoms, alternatively from 5 to 8 carbon atoms. Examples of cycloalkyl groups include, but are not limited to, cyclopentyl, cyclohexyl, and methylcyclohexyl.

Examples of alcohols include, but are not limited to, methanol, ethanol, 1-propanol, 2-propanol, 1-butanol, 2-butanol, 2-methyl-1-butanol, 1,1-dimethyl-1-ethanol, pentanol, hexanol, cyclohexanol, heptanol, and octanol. The alcohol can be a single alcohol or a mixture comprising two or more different alcohols, each as described and exemplified above.

The organic solvent can be any aprotic or dipolar aprotic organic solvent that does not react with the halodisilane, the halosilane, or the silicone resin product under the conditions of the present method, and is miscible with the halodisilane, the halosilane, and the silicone resin. The organic solvent can be immiscible or miscible with water. As used herein, the term "immiscible" means that the solubility of water in the solvent is less than about 0.1 g/100 g of solvent at 25° C. The organic solvent can also be the alcohol having the formula $R^2OH$, wherein $R^2$ is as described and exemplified above, that is reacted with the halodisilane and, optionally, the halosilane.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; halogenated aromatic hydrocarbons such as bromobenzene and chlorobenzene; and alcohols such as methanol, ethanol, 1-propanol, 2-propanol, 1-butanol, 2-butanol, 2-methyl-1-butanol, 1,1-dimethyl-1-ethanol, pentanol, hexanol, cyclohexanol, hepatanol, and octanol.

The organic solvent can be a single organic solvent or a mixture comprising two or more different organic solvents, each as described and exemplified above.

The reaction of the halodisilane and the optional halosilane with the alcohol to produce the alcoholysis product can be carried out in any standard reactor suitable for contacting, for example, halosilanes with alcohol. Suitable reactors include glass and Teflon-lined glass reactors. Preferably, the reactor is equipped with a means of agitation, such as stirring.

The halodisilane, the optional halosilane, the alcohol, and the organic solvent can be combined in any order. Typically, the halodisilane and optional halosilane are combined with the alcohol in the presence of the organic solvent by adding the alcohol to a mixture of the halodisilane, optional halosilane, and organic solvent. Reverse addition, i.e., addition of the silane(s) to the alcohol is also possible. The hydrogen halide gas (e.g., HCl) produced as a by-product in the reaction is typically allowed to pass from the reaction vessel into an acid neutralization trap.

The rate of addition of the alcohol to the halodisilane and the optional halosilane is typically from 5 mL/min. to 50 mL/min. for a 1000-mL reaction vessel equipped with an efficient means of stirring. When the rate of addition is too slow, the reaction time is unnecessarily prolonged. When the rate of addition is too fast, the violent evolution of hydrogen halide gas may be hazardous.

The reaction of the halodisilane and the optional halosilane with the alcohol is typically carried out at room temperature (~23±2° C.). However, the reaction can be carried out at lower or higher temperatures. For example, the reaction can be carried out at a temperature of from 10° C. to 60° C.

The reaction time depends on several factors, including the structures of the halodisilane and the optional halosilane, and the temperature. The reaction is typically carried out for an amount of time sufficient to complete alcoholysis of the halodisilane and the optional halosilane. As used herein, the term "to complete alcoholysis" means that at least 85 mol % of the silicon-bonded halogen atoms originally present in the halodisilane and the optional halosilane combined are replaced with the group —$OR^2$. For example, the reaction time is typically from 5 to 180 min., alternatively from 10 to 60 min., alternatively from 15 to 25 min., at a temperature of from 10 to 60° C. The optimum reaction time can be determined by routine experimentation using the methods set forth in the Examples section below.

The concentration of the halodisilane in the reaction mixture is typically from 5 to 95% (w/w), alternatively from 20 to 70% (w/w), alternatively from 40 to 60% (w/w), based on the total weight of the reaction mixture.

The mole ratio of the halosilane to the halodisilane is typically from 0 to 99, alternatively from 0.5 to 80, alternatively from 0.5 to 60, alternatively from 0.5 to 40, alternatively from 0.5 to 20, alternatively from 0.5 to 2.

The mole ratio of the alcohol to the silicon-bonded halogen atoms in the halodisilane and the halosilane combined is typically from 0.5 to 10, alternatively from 1 to 5, alternatively from 1 to 2.

The concentration of the organic solvent is typically from 0 to 95% (w/w), alternatively from 5 to 88% (w/w), alternatively from 30 to 82% (w/w), based on the total weight of the reaction mixture.

In step (ii) of the method, the alcoholysis product is reacted with water at a temperature of from 0 to 40° C. to produce a hydrolyzate.

The alcoholysis product is typically combined with water by adding the alcoholysis product to the water. Reverse addition, i.e., addition of water to the alcoholysis product is also possible. However, reverse addition may result in formation of predominately gels.

The rate of addition of the alcoholysis product to water is typically from 2 mL/min. to 100 mL/min. for a 1000-mL reaction vessel equipped with an efficient means of stirring. When the rate of addition is too slow, the reaction time is unnecessarily prolonged. When the rate of addition is too fast, the reaction mixture may form a gel.

The reaction of step (ii) is typically carried out at a temperature of from 0 to 40° C., alternatively from 0 to 20° C., alternatively from 0 to 5° C. When the temperature is less than 0° C., the rate of the reaction is typically very slow. When the temperature is greater than 40° C., the reaction mixture may form a gel.

The reaction time depends on several factors, including the structure of the alcoholysis product and the temperature. The reaction is typically carried out for an amount of time sufficient to complete hydrolysis of the alcoholysis product. As used herein, the term "to complete hydrolysis" means that at least 85 mol % of the silicon-bonded groups —$OR^2$ originally present in the alcoholysis product are replaced with hydroxy groups. For example, the reaction time is typically from 0.5 min. to 5 h, alternatively from 1 min. to 3 h, alternatively from 5 min. to 1 h at a temperature of from 0 to 40° C. The optimum reaction time can be determined by routine experimentation using the methods set forth in the Examples section below.

The concentration of water in the reaction mixture is typically sufficient to effect hydrolysis of the alcoholysis product. For example, the concentration of water is typically from 1 mole to 50 moles, alternatively from 5 moles to 20 moles, alternatively from 8 moles to 15 moles, per mole of the silicon-bonded groups —$OR^2$ in the alcoholysis product.

In step (iii) of the method of preparing the silicone resin, the hydrolyzate is heated to produce the silicone resin. The hydrolyzate is typically heated at a temperature of from 40 to 100° C., alternatively from 50 to 85° C., alternatively from 55 to 70° C. The hydrolyzate is typically heated for a period of time sufficient to produce a silicone resin having a number-average molecular weight of from 200 to 500,000. For example, the hydrolyzate is typically heated for a period of from 1 h to 2 h, at a temperature of from 55° C. to 70° C.

The method can further comprise recovering the silicone resin. When the mixture of step (iii) contains a water-immiscible organic solvent, such as tetrahydrofuran, the silicone resin can be recovered from the reaction mixture by separating the organic phase containing the resin from the aqueous phase. The separation can be carried out by discontinuing agitation of the mixture, allowing the mixture to separate into two layers, and removing the aqueous or organic phase. The organic phase is typically washed with water. The water can further comprise a neutral inorganic salt, such as sodium chloride, to minimize formation of an emulsion between the water and organic phase during washing. The concentration of the neutral inorganic salt in the water can be up to saturation. The organic phase can be washed by mixing it with water, allowing the mixture to separate into two layers, and removing the aqueous layer. The organic phase is typically washed from 1 to 5 times with separate portions of water. The volume of water per wash is typically from 0.5 to 2 times the volume of the organic phase. The mixing can be carried out by conventional methods, such as stirring or shaking. The silicone resin can be used without further isolation or purification or the resin can be separated from most of the solvent by conventional methods of evaporation.

When the mixture of step (iii) contains a water-miscible organic solvent (e.g., methanol), the silicone resin can be recovered from the reaction mixture by separating the resin from the aqueous solution. For example, the separation can be carried out by distilling the mixture at atmospheric or subatmospheric pressure. The distillation is typically carried out at a temperature of from 40 to 60° C., alternatively from 60 to 80° C., at a pressure of 0.5 kPa.

Alternatively, the silicone resin can be separated from the aqueous solution by extracting the mixture containing the resin with a water immiscible organic solvent, such as methyl isobutyl ketone. The silicone resin can be used without further isolation or purification or the resin can be separated from most of the solvent by conventional methods of evaporation.

The silicone resin prepared according to the present method typically has the formula $[O_{(3-a)/2}R^1_a Si\text{—}SiR^1_b O_{(3-b)/2}]_v (R^1_3 SiO_{1/2})_w (R^1_2 SiO_{2/2})_x (R^1 SiO_{3/2})_y (SiO_{4/2})_z$, wherein each $R^1$ is independently —H, hydrocarbyl, or substituted hydrocarbyl; a is 0, 1, or 2; b is 0, 1, 2 or 3; v is from 0.01 to 1, w is from 0 to 0.84; x is from 0 to 0.99; y is from 0 to 0.99; z is from 0 to 0.95; and v+w+x+y+z=1.

The hydrocarbyl groups and substituted hydrocarbyl groups represented by $R^1$ are as described and exemplified above for the halodisilane.

In the formula of the silicone resin, the subscripts v, w, x, y, and z are mole fractions. The subscript v typically has a value of from 0.01 to 1, alternatively from 0.2 to 0.8, alternatively from 0.3 to 0.6; the subscript w typically has a value of from 0 to 0.84, alternatively from 0.1 to 0.6, alternatively from 0.2 to 0.4; the subscript x typically has a value of from 0 to 0.99, alternatively from 0.1 to 0.8, alternatively from 0.2 to 0.6; the subscript y typically has a value of from 0 to 0.99, alternatively from 0.2 to 0.8, alternatively from 0.4 to 0.6; and the subscript z typically has a value of from 0 to 0.95, alternatively from 0.1 to 0.7, alternatively from 0.2 to 0.5.

The silicone resin typically has a number-average molecular weight of from 200 to 500,000, alternatively from 500 to 150,000, alternatively from 1,000 to 75,000, alternatively from 2,000 to 12,000, wherein the molecular weight is determined by gel permeation chromatography using a refractive index detector and polystyrene standards.

The silicone resin typically contains from 1 to 50% (w/w), alternatively from 5 to 50% (w/w), alternatively from 5 to 35% (w/w), alternatively from 10% to 35% (w/w), alternatively from 10 to 20% (w/w), of silicon-bonded hydroxy groups based on the total weight of the resin, as determined by $^{29}$Si NMR.

The silicone resin of the present invention is soluble in a variety of organic solvents. For example, the solubility of the silicone resin in an organic solvent, which depends on the structure, molecular weight, and content of silicon-bonded hydroxy groups, is typically at least 2 g/mL, alternatively at least 1 g/mL, at room temperature (~23±2° C.). In particular, the solubility of the silicone resin in methyl isobutyl ketone is typically from 0.1 to 2 g/mL, alternatively from 0.2 to 1 g/mL, at room temperature (~23±2° C.).

The silicone resin is also substantially free of gel as determined by visible light spectrometry. For example, a solution containing 16% (w/w) of the resin in an organic solvent typically has a percent transmittance of at least 70%, alternatively at least 80%, alternatively at least 90%, for light in the visible region (~400 to ~700 nm) of the electromagnetic spectrum, as measured using a cell having a path length of 2.54 cm.

Examples of silicone resins that can be prepared by the present method include, but are not limited to, resins having the following formulae: $(O_{2/2}MeSiSiO_{3/2})_{0.1}$ $(PhSiO_{3/2})_{0.9}$, $(O_{2/2}MeSiSiMeO_{2/2})_{0.2}(Me_2SiO_{2/2})_{0.1}(PhSiO_{3/2})_{0.7}$, $(O_{2/2}MeSiSiO_{3/2})_{0.1}(O_{2/2}MeSiSiMeO_{2/2})_{0.15}(Me_2SiO_{2/2})_{0.1}(MeSiO_{3/2})_{0.65}$, $(O_{1/2}Me_2SiSiO_{3/2})_{0.25}(SiO_{4/2})_{0.5}(MePhSiO_{2/2})_{0.25}$, $(O_{2/2}EtSiSiEt_2O_{1/2})_{0.1}((O_{2/2}MeSiSiO_{3/2})_{0.15}(Me_3SiO_{1/2})_{0.05}(PhSiO_{3/2})_{0.5}(SiO_{4/2})_{0.2}$, $(O_{2/2}MeSiSiO_{3/2})_{0.3}$ $(PhSiO_{3/2})_{0.7}$, $(O_{2/2}MeSiSiO_{3/2})_{0.4}(MeSiO_{3/2})_{0.6}$, $(O_{3/2}SiSiMeO_{2/2})_{0.5}(Me_2SiO_{2/2})_{0.5}$, $(O_{3/2}SiSiMeO_{2/2})_{0.6}(Me_2SiO_{2/2})_{0.4}$, $(O_{3/2}SiSiMeO_{2/2})_{0.7}(Me_2SiO_{2/2})_{0.3}$, $(O_{3/2}SiSiMe_2O_{1/2})_{0.75}(PhSiO_{3/2})_{0.25}$, $(O_{3/2}SiSiMeO_{2/2})_{0.75}(SiO_{4/2})_{0.25}$, $(O_{2/2}MeSiSiMe_2O_{1/2})_{0.5}(O_{2/2}MeSiSiO_{3/2})_{0.3}(PhSiO_{3/2})_{0.2}$, $(O_{2/2}EtSiSiMeO_{2/2})_{0.8}(MeSiO_{3/2})_{0.05}(SiO_{4/2})_{0.15}$, $(O_{2/2}MeSiSiO_{3/2})_{0.8}(Me_3SiO_{1/2})_{0.05}(Me_2SiO_{2/2})_{0.1}(SiO_{4/2})_{0.5}$, $(O_{2/2}MeSiSiEtO_{2/2})_{0.25}(O_{3/2}SiSiMeO_{2/2})_{0.6}(MeSiO_{3/2})_{0.1}(SiO_{4/2})_{0.05}$, $(O_{1/2}Me_2SiSiMeO_{2/2})_{0.75}(O_{2/2}MeSiSiMeO_{2/2})_{0.25}$, $(O_{1/2}Et_2SiSiEtO_{2/2})_{0.5}(O_{2/2}EtSiSiEtO_{2/2})_{0.5}$, $(O_{1/2}Et_2SiSiEtO_{2/2})_{0.2}(O_{2/2}MeSiSiMeO_{2/2})_{0.8}$, $(O_{1/2}Me_2SiSiMeO_{2/2}/)_{0.6}(O_{2/2}EtSiSiEtO_{2/2})_{0.4}$, $(O_{3/2}SiSiO_{3/2})_m$, $(O_{3/2}SiSiMeO_{2/2})_m$, $(O_{3/2}SiSiMe_2O_{1/2})_m$, $(O_{3/2}SiSiMe_3)_m$, $(O_{2/2}MeSiSiMeO_{2/2})_m$, $(O_{2/2}MeSiSiMe_2O_{1/2})_m$, $(O_{2/2}MeSiSiMe_3)_m$, $(O_{1/2}Me_2SiSiMeO_{2/2})_m$, $(O_{3/2}SiSiEtO_{2/2})_m$, $(O_{3/2}SiSiEt_2O_{1/2})_m$, $(O_{3/2}SiSiEt_3)_m$, $(O_{2/2}EtSiSiEtO_{2/2})_m$, $(O_{2/2}EtSiSiEt_2O_{1/2})_m$, $(O_{2/2}EtSiSiEt_3)_m$, and $(O_{1/2}Et_2SiSiEtO_{2/2})_m$, where Me is methyl, Et is ethyl, Ph is phenyl, m has a value such that the resin has a number-average molecular weight of from 200 to 500,000, and the numerical subscripts outside the parenthesis denote mole fractions. Also, in the preceding formulae, the sequence of units is unspecified.

The method of the present invention produces a silicone resin that is curable, substantially free of gel, and highly soluble in organic solvents. Moreover, the method can be utilized to produce a silicone resin having high molecular weight. Also, the silicone resin can be readily and efficiently removed from the reaction mixture. Further, the method can be carried out economically with readily available starting materials. Still further, the method can be scaled to a commercial manufacturing process.

The silicone resin product of the present method can be used to form a cured coating on substrates employed in numerous electronic devices, including semiconductor devices, liquid crystals, light-emitting diodes, organic light-emitting diodes, optoelectronic devices, optical devices, photovoltaic cells, thin film batteries, and solar cells.

EXAMPLES

The following examples are presented to better illustrate the method of the present invention, but are not to be considered as limiting the invention, which is delineated in the appended claims. Unless otherwise noted, all parts and percentages reported in the examples are by weight. The following methods and materials were employed in the examples:

Determination of Molecular Weights

Number-average and weight-average molecular weights ($M_n$ and $M_w$) of silicone resins were determined by gel permeation chromatography (GPC) using a PLgel (Polymer Laboratories, Inc.) 5-μm column at room temperature (~23° C.), a THF mobile phase at 1 mL/min, and a refractive index detector. Polystyrene standards were used for linear regression calibrations.

Disilane Composition A is a chlorodisilane stream obtained by fractional distillation of the residue produced in the direct process for manufacturing methylchlorosilanes. The composition contains $C_4H_9SiMeCl_2$, 7.1%, $Me_3Cl_3Si_2O$, 0.3%, $Me_4Cl_2Si_2$, 8.6%, $Me_2Cl_4Si_2O$, 1.9%, $C_{10}$ hydrocarbon, 1.9%, $Me_3Cl_3Si_2$, 25.8%, and $Me_2Cl_4Si_2$, 52.8%, based on total weight.

Disilane Composition B is a chlorodisilane stream obtained by fractional distillation of the residue produced in the direct process for manufacturing methylchlorosilanes. The composition contains $Me_4Cl_2Si_2$, 0.1%, $Me_3Cl_3Si_2$, 30.9%, and $Me_2Cl_4Si_2$, 66.2%, based on total weight.

Example 1

Disilane Composition A (30 g), was mixed with 120 g of methyl isobutyl ketone and 38.4 g of anhydrous methanol. The HCl produced from the reaction was allowed to escape from the open mouth of the flask. The liquid mixture was placed in a sealed bottle, chilled in an ice water bath, and then transferred to an addition funnel mounted on top of a three necked round bottom flask equipped with a stirrer and a thermometer. Deionized water (120 g) was placed in the flask and cooled with an external ice water bath to 2 to 4° C. The mixture in the addition funnel was continuously added to the chilled deionized water over a period of 10 min., during which time the temperature of the mixture increased by 3 to 5° C. After completion of the addition, the mixture was stirred in the ice bath for 1 h. The flask was then heated to 50 to 75° C. with a water bath and held at that temperature for 1 h. The mixture was allowed to cool to room temperature and then washed with a solution of 10 g of NaCl in 200 mL of water, four times. After each wash the aqueous phase was discarded. The organic phase was isolated and concentrated at 60° C. and a pressure of 2.7 kPa to produce solutions containing 39.1% (w/w) and 47.5% (w/w) of the silicone resin in MIBK. The resin has a weight-average molecular weight of about 3500, a number-average molecular weight of about 1740, and contains about 8 mol % of silicon-bonded hydroxy groups.

Example 2

A solution containing 16.0% of silicone resin in MIBK was prepared as described in Example 1, except Disilane Composition A was replaced with Disilane Composition B.

That which is claimed is:

1. A method of preparing a silicone resin, the method comprising:
   (i) reacting at least one halodisilane having the formula $Z_{3-a}R^1_aSi\text{—}SiR^1_bZ_{3-b}$ and, optionally, at lease one halosilane having the formula $R^1_bSiZ_{4-b}$ with at least one alcohol having the formula $R^2OH$ in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, and b=0, 1, 2 or 3;
   (ii) reacting the alcoholysis product with water at a temperature of from 0 to 40° C. such that at least 85 mol % of silicon-bonded alkoxy groups in the alcoholysis product are hydrolyzed to produce a hydrolyzate; and
   (iii) heating the hydrolyzate to produce the resin.

2. The method according to claim 1, wherein both the halodisilane and the halosilane are reacted with the alcohol in the presence of the organic solvent to produce the alcoholysis product.

3. The method according to claim 1, wherein the solvent is a ketone.

4. The method according to claim 3, wherein the ketone is methyl isobutyl ketone.

5. The method according to claim 1, wherein step (i) is carried out by adding the alcohol to a mixture of the halodisilane, the halosilane and the organic solvent.

6. The method according to claim 1, wherein the mole ratio of the halosilane to the halodisilane is from 0.5 to 80.

7. The method according the claim 1, wherein step (ii) is carried out at a temperature of from 0 to 20° C.

8. The method according to claim 1, wherein step (iii) is carried out a temperature of from 40 to 100° C.

9. The method according to claim 1, wherein the silicone resin has the formula $[O_{(3-a)/2}R^1_aSi\text{—}SiR^1_bO_{(3-b)/2}]_v(R^1_3SiO_{1/2})_w(R^1_2SiO_{2/2})_x(R^1SiO_{3/2})_y(SiO_{4/2})_z$, wherein each $R^1$ is independently —H, hydrocarbyl, or substituted hydrocarbyl; a is 0, 1, or 2; b is 0, 1, 2 or 3; v is from 0.01 to 1, w is from 0 to 0.84; x is from 0 to 0.99; y is from 0 to 0.99; z is from 0 to 0.95; and v+w+x+y+z=1.

10. The silicone resin made by the method of claim 9.

11. The method according to claim 1, wherein the silicone resin has a number-average molecular weight of from 500 to 150,000.

12. The method according to claim 1, wherein the silicone resin contains from 5 to 50% (w/w) of silicon-bonded hydroxy groups.

13. The silicone resin made by the method of claim 12.

14. The silicone resin made by the method of claim 1.

* * * * *